United States Patent [19]
Nakamura et al.

[11] Patent Number: 6,146,540
[45] Date of Patent: Nov. 14, 2000

[54] DEHYDRATION OF SLUDGE BY INJECTING SLUDGE INTO A SEQUENTIALLY CONNECTED SERIES OF PERMEABLE BAGS AND THEN SQUEEZING THE BAGS

[75] Inventors: Shinichi Nakamura, Osaka; Kunihiko Fukuzuka, Habikino, both of Japan

[73] Assignee: Omega Co., Ltd., Japan

[21] Appl. No.: 09/305,424

[22] Filed: May 5, 1999

[30] Foreign Application Priority Data

Jun. 24, 1998 [JP] Japan .................................. 10-193773

[51] Int. Cl.$^7$ .......................... C02F 11/12; B01D 33/72; B01D 37/04
[52] U.S. Cl. .......................... 210/745; 210/746; 210/770; 210/780; 210/805; 210/386; 210/387; 100/36; 100/37; 100/120; 100/121; 100/152; 100/153; 452/35; 452/46
[58] Field of Search .................................... 210/745, 746, 210/770, 780, 805, 386, 387; 100/36, 37, 118, 119, 120, 121, 151, 152, 153; 452/35, 46

[56] References Cited

U.S. PATENT DOCUMENTS

| | | | |
|---|---|---|---|
| 2,796,810 | 6/1957 | Müller . | |
| 3,654,074 | 4/1972 | Jacquelin | 162/213 |
| 3,747,766 | 7/1973 | Brooks | 210/304 |
| 3,914,080 | 10/1975 | Kamp | 198/191 |
| 4,039,450 | 8/1977 | Brown | 210/400 |
| 4,131,546 | 12/1978 | Olsson et al. | 210/359 |
| 4,260,496 | 4/1981 | Beer | 210/780 |
| 4,501,669 | 2/1985 | Hakansson et al. | 210/770 |
| 4,518,507 | 5/1985 | Conner | 210/747 |
| 4,681,688 | 7/1987 | Sondov et al. | 210/770 |
| 5,433,851 | 7/1995 | Itoh | 210/386 |
| 5,439,598 | 8/1995 | Clough | 210/770 |
| 5,520,824 | 5/1996 | Sasaki | 210/780 |

*Primary Examiner*—Robert J. Popovics
*Attorney, Agent, or Firm*—Hayes, Soloway, Hennessey, Grossman & Hage, P.C.

[57] ABSTRACT

A plurality of unit bags 2a, 2b . . . are composed of a permeable strip-shaped nonwoven and arranged in a successive fashion without break so that they can be easily accommodated and stored by being rolled. An annular elastic body 5 disposed around an opening 3a formed to an end of each bag 2a permits the opening 3a to be opened. Since an optically sensing object or a magnetically sensing object is disposed around the opening 3a or at a position spaced apart from the openings 3a, 3b . . . a prescribed distance, the portion of the sensing object can be positioned by a sensing device 15. Further, when, for example, sludge, and the like containing water are accommodated in a waste accommodating bag 1 and squeezed, the sludge, and the like can be easily dehydrated. With this arrangement, there can be provided a waste accommodating bag, a waste treatment system using the waste accommodating bag and a waste treatment apparatus capable of simply dehydrating water-containing wastes such as sludge in a sludge tank (including a pond, lagoon, and the like as the target of the present invention) and easily and economically disposing of the wastes as well as stably subjecting the sludge in a combined treatment tank to a biological treatment.

8 Claims, 8 Drawing Sheets

DEHYDRATION OF SLUDGE BY INJECTING SLUDGE INTO A SEQUENTIALLY CONNECTED SERIES OF PERMEABLE BAGS AND THEN SQUEEZING THE BAGS

BACKGROUND OF THE INVENTION

1. Field of the Invention

The present invention relates to a waste accommodating bag capable of simply dehydrating sludge in which a lot of water-containing-waste is deposited and easily disposing of the sludge, a waste treatment system using the waste accommodating bag and a waste treatment apparatus.

2. Description of the Related Art

Sludge, and the like generated in sewage, cesspools, ponds, lagoons, fish ponds, sewage works, industrial waste processing yards, and the like have been dehydrated by means of vacuum filtering apparatuses, pressure filtering apparatuses, centrifugal separators, and the like.

Since these apparatuses are large in size and expensive, sludge accommodated in small combined treatment tanks used in homes, restaurants, and the like are extracted under vacuum and disposed of.

Since the sludge contains a large amount water, the sludge is extracted together with the water and transported in a sealed state to prevent the leakage thereof. Thus, the transportation cost of the sludge is expensive and the transportation is uneconomical. In addition, since the large amount of the water is contained in the extracted sludge, it must be dehydrated in sewage works or by large dehydrating apparatuses before they are destroyed by fire.

Since many of the small sludge treatment facilities are installed in urban areas, a sludge extracting job causes environmental pollution due to bad smell as well as is costly.

A biological treatment can be stably performed in the combined treatment tank by gradually extracting surplus sludge. Since, however, a large amount of sludge is ordinarily extracted at one stroke only once or twice a year at present, such a system of extraction is not preferable to the biological treatment.

At present, however, there is not available such a small treatment apparatus as to periodically extract surplus sludge generated in water discharge facilities little by little.

It is preferable to crush and fluidize kitchen garbage generated from homes and restaurants in the view of the biological treatment, it is prohibited at present in Japan to directly discharge the kitchen garbage treated by a disposer to sewage.

However, since housing complexes having built recently are usually equipped with a dedicated combined treatment tank, kitchen garbage treated by the disposer can be discharged to the combined treatment tank. Accordingly, the amount of generated sludge is increased as compared with a conventional amount.

On the other hand, it is preferable to treat wastes at the locations where they are generated as much as possible because the unrational and unsanitary pickup and transportation of bulky wastes can be avoided by it as well as the wastes need not almost be classified.

Further, waste water discharged from homes, which is mainly composed of kitchen garbage, and excrement and urine, can not only be reduced in amount by the biological treatment but also used as fertilizer by being made to compost by fermentation, and the like. However, when the waste water discharged from homes contains excessive water, there arises a problem that an agitator cannot be driven by overload and the waste water discharged from homes is not stably fermented.

SUMMARY OF THE INVENTION

Accordingly, an object of the present invention for solving the above problems is to provide a waste accommodating bag, a waste treatment system using the waste accommodating bag and a waste treatment apparatus capable of simply dehydrating water-containing wastes such as sludge in a sludge tank (including a pond, lagoon, and the like as the target of the present invention), easily and economically treating the wastes as well as stably performing the biological treatment of the sludge in a combined treatment tank.

A waste treatment system using a waste accommodating bag of the present invention has a feature that it comprises the steps of accommodating sludge waste discharged from a sludge tank in a permeable bag fed successively through the opening of the bag; dehydrating the sludge waste by squeezing the bag in which the sludge waste is accommodated; and returning the water squeezed from sludge waste to the sludge tank.

(a) According to the above feature, since the precipitated sludge waste can be accommodated in the bag through the opening thereof and dehydrated by being squeezed by a dehydrating means, the sludge waste can be taken out in a solid state, whereby it can be disposed of sanitarily and easily.

A waste accommodating bag of the present invention has a feature that it comprises a permeable bag member composed of a series of laterally long strip-shaped member with the upper edge thereof opened and the lower edge thereof closed for accommodating and dehydrating water-containing sludge waste.

(b) According to the above feature, since the bag used to dehydrate the sludge waste is sequentially fed with the upper edge opened and the lower edge closed, not only the sludge waste can be successively charged thereinto but also the bag can be stored in a layered state (folded or wound) in a small space as well as the sludge waste can be reliably dehydrated.

A waste accommodating bag of the present invention of the present invention has a feature that it comprises a plurality of permeable unit bags formed to a strip-shape and sequentially connected to each other with the upper edges of the unit bags opened and the lower edges thereof closed for accommodating and dehydrating water-containing sludge waste.

(c) According to the feature, not only the bags can be stored in a layered state (folded or wound) in a small space but also the sludge waste can be reliably dehydrated by intermittently charging the sludge waste.

In the waste accommodating bag of the present invention, it is preferable that an elastic member is disposed around the opening of each of the plurality of permeable unit bags successively connected to each other formed to an end thereof for expanding the opening, the closed bottom of a preceding unit bag is located just forwardly of the opening of a following bag and a magnetic sensing object or an optical sensing object is disposed around the opening or at a position spaced apart from the opening a prescribed distance.

(d) According to the feature, since the plurality of unit bags are successively formed to the permeable strip-shaped nonwoven fabric, the unit bags can be made compact by being wound and easily stored as well as successively fed one by one. Since the annular elastic member is disposed around the opening of each of the bags, when the bags are successively fed from a rolled unit, the opening can be expanded by the elastic force of the annular elastic member. Since the magnetically sensing object or the optically sensing object is disposed around the opening or at a position spaced apart from the opening a prescribed distance, the opening fed from the rolled unit can be positioned by sensing the sensing object by, for example, a sensor. Further, when sludge, and the like which contain water are accommodated in the waste accommodating bag and squeezed, the sludge can be easily dehydrated.

In the waste accommodating bag of the present invention, it is preferable that paint or powder composed of a magnetic material is applied around the opening or at a position spaced apart from the opening a prescribed distance.

(e) With this arrangement, the bags can be reliably detected even if they are flexible.

A waste treatment apparatus of the present invention has a feature that it comprises a sludge tank for accommodating water-containing sludge waste; a strip-shaped permeable waste accommodating bag having a plurality of unit bags to which openings are formed at prescribed intervals; a bag feed device for successively feeding the waste accommodating bag for accommodating the sludge waste discharged from the sludge tank in a prescribed quantity and positioning the openings of the respective unit bags just below the discharge port of a storage tank; a position sensing device for sensing the opening of the unit bag fed just below the discharge port and transmitting the position signal of the opening to the bag feed device; a dehydrating device for squeezing and dehydrating the sludge waste accommodated in the waste accommodating bag through the opening positioned just below the discharge port of the storage tank; and a liquid return device for returning the squeezed water to the sludge tank.

(f) According to the above feature, when the strip-shaped waste accommodating bags are successively fed by a bag feed device and the openings of the bags are positioned just below the discharge port of the sludge tank, the sludge waste can be sequentially accommodated into the bags from the openings at prescribed intervals and the sludge waste in the bags is effectively dehydrated by being squeezed by the dehydrating device. Further, the water obtained from the dehydrated sludge waste can be returned to a combined treatment tank.

In the waste treatment apparatus of the present invention, it is preferable that the dehydrating device comprises a closing member for closing the opening of the unit bag in which the sludge waste is accommodated; a strip-shaped abutting plate extending along a side of the unit bags moving downward; a flexible protection plate disposed in confrontation with the abutting plate through the unit bags which accommodate the sludge waste therein and are interposed therebetween; and a roller member moving in a longitudinal direction while squeezing the unit bags between it and the abutting plate through the protective plate.

(g) With this arrangement, since the unit bag, which moves downward with the opening closed by the closing means, is squeezed between the roller member and the strip-shaped abutting plate through the protection plate, the roller member does not directly come into contact with the unit bag. Accordingly, the breakage of the unit bag is avoided when it is squeezed and the prescribed shape of the unit bag can be maintained without the leakage of the sludge waste, whereby the disposal of the sludge waste can be rationalized.

It is preferable that the waste treatment apparatus of the present invention comprises an extending and contracting cylindrical discharge member for discharging the sludge waste in the prescribed quantity; and an expanding mechanism disposed to the discharge port of the cylindrical discharge member at the extreme end thereof for expanding the opening of the unit bag in a process that the cylindrical discharge member is moved toward the opening of the unit bag and the discharge port is inserted into the opening of the unit bag.

(h) With this arrangement, even if the opening of the unit bag is not reliably positioned or even if the opening is inclined and the charge of the sludge waste is obstructed, the opening of the unit bag can be expanded by the expanding mechanism in the process that the discharge port is inserted into the opening.

In the waste treatment apparatus of the present invention, it is preferable that the abutting plate has rigidity and a plurality of through holes formed thereto.

(i) With this arrangement, since the unit bag can be sufficiently squeezed in the dehydration process, the water extracted from the unit bag can be discharged to the outside through the through holes of the abutting plate, whereby the dehydrating property of the unit bag can be improved.

A waste treatment apparatus of the present invention comprises a sludge tank for accommodating water-containing sludge waste; a laterally long strip-shaped permeable waste accommodating bag fed successively and having open upper edges and a closed lower edge; a discharge port for supplying the sludge waste from the sludge tank to the upwardly facing opening of the waste accommodating bag; a dehydrating device for squeezing and dehydrating the sludge waste accommodated in the waste accommodating bag; and a liquid return means for returning the squeezed water to the sludge tank.

(j) According to the above feature, the sludge waste can be successively charged because the upper edges of the waste accommodating bags are opened at all times and dehydration can be performed effectively by the dehydration processing associated with the charge. Further, the cake obtained from the dehydrated waste can be formed to a plate shape, whereby the waste can be easily transported for disposal and destroy by fire.

DESCRIPTION OF THE PREFERRED EMBODIMENTS

Figure 1:
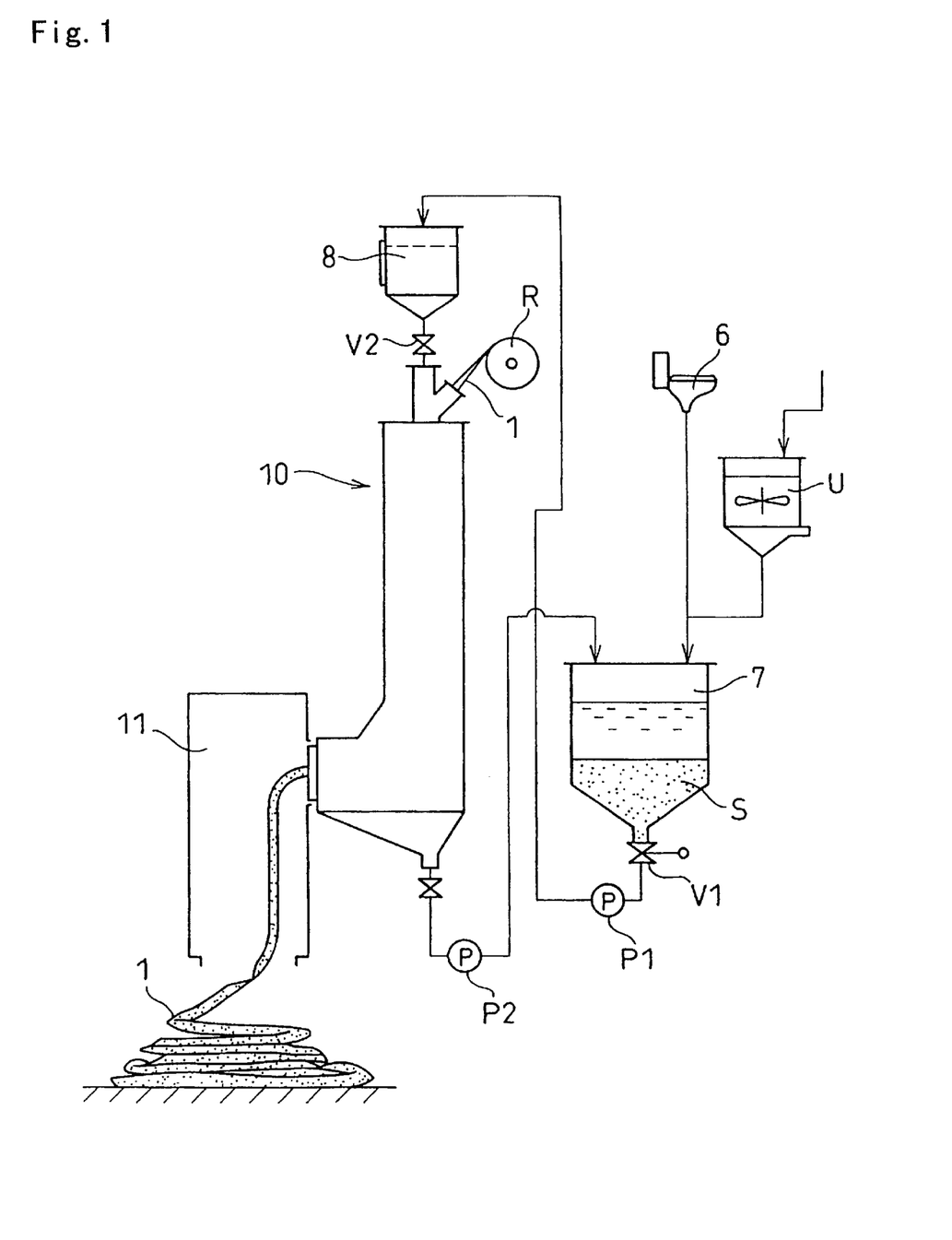
FIG. 1 is a conceptual view showing a waste treatment system using a waste accommodating bag as an embodiment of the present invention.
Figure 2:
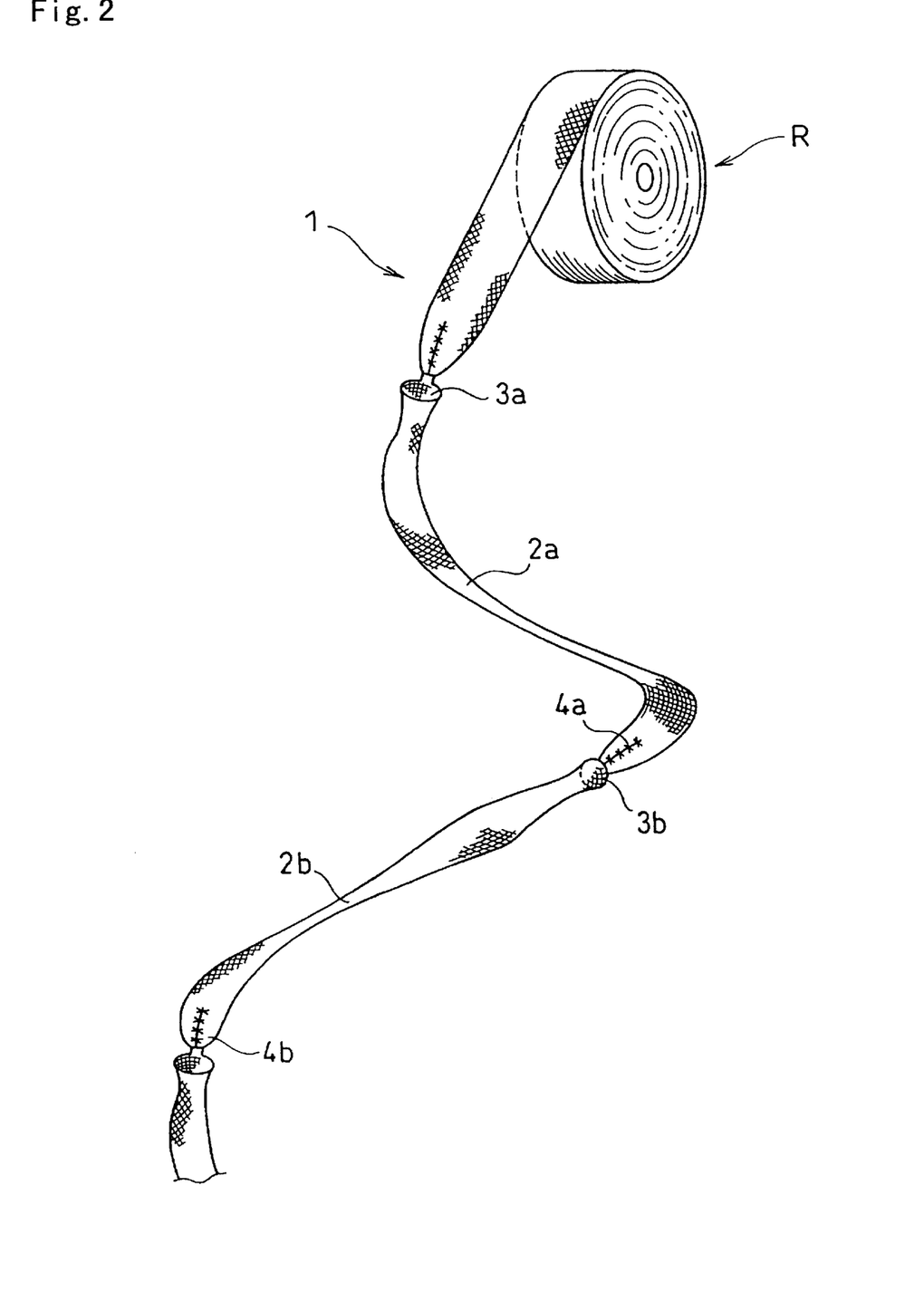
FIG. 2 is a perspective view showing the waste accommodating bag of the present invention.

Embodiments of the present invention will be described below with reference to the accompanying drawings. FIG. 1 is a conceptual view showing a waste treatment system using a waste accommodating bag as an embodiment of the present invention and FIG. 2 is a perspective view showing the waste accommodating bag of the present invention. Although the embodiments shows a case that they are applied to a small apparatus, it is possible to apply them to a large apparatus.

First, an embodiment of the waste accommodating bag of the present invention will be described. In FIG. 2, numeral 1 denotes the waste accommodating bag which is composed of a permeable strip-shaped nonwoven fabric. A plurality of unit bags 2a, 2b . . . are successively formed of the strip-shaped nonwoven fabric; rubber-string-like annular elastic bodies 5 are attached around the openings 3a, 3b . . . formed to one ends of the respective unit bags 2a, 2b . . . ; closed bottoms are formed to the other ends of the respective unit bags 2a, 2b . . . ; and sensing objects 6 which can be detected magnetically or optically are disposed around the openings 3a, 3b . . . .

In this case, since the waste accommodating bag 1 includes the unit bags 2a, 2b . . . which are formed of the strip-shaped nonwoven fabric and have a prescribed length, respectively, the waste accommodating bag 1 can be rolled up to a disc-shape so as to be made compact.

The sensor 6 disposed around the opening 3a may be magnetic paint or magnetic power applied therearound or a magnetic tape bonded thereto. Otherwise, the annular elastic body 5 may be composed of a magnetic body.

Although it is preferable to use, for example, polyester nonwoven fabric (#11208, 20 g/m$^2$) made by Asahi Chemical Co. as the nonwoven fabric used here, shoji paper having approximately the same filtering function as that of the nonwoven fabric may be used and further recycled paper composed of long fibers can be economically used.

The waste accommodating bag 1 arranged as described above is accommodated and stored in the rolled-up state and can be transported in the rolled-up state.

When the waste accommodating bag 1 is used to dehydrate sludge, the unit bags 2a, 2b, . . . are unrolled from a rolled unit R to a prescribed length. At the time, when the respective unit bags 2a, 2b . . . are drawn out, the openings 3a, 3b . . . thereof are expanded to an approximately annular shape by the returning elastic force of the string-like annular elastic body 5 on the appearance of the openings 3a, 3b . . . from the rolled unit R.

Since the unit bags 2a, 2b . . . are successively formed of the strip-shaped nonwoven fabric, they can be made compact by being rolled-up as well as successively and smoothly fed.

Since the annular elastic bodies 5 are attached around the openings 3a, 3b . . . formed to the one ends of the respective unit bags 2a, 2b . . . , when they are successively fed from the rolled unit R, the openings 3a, 3b . . . can be expanded by the elastic force of the annular elastic bodies 5, whereby sludge can be reliably charged into the openings 3a, 3b . . . .

The openings 3a, 3b . . . of the unit bags 2a, 2b . . . fed from the rolled unit R can be correctly positioned by sensing the sensing objects 6 provided with the openings 3a, 3b . . . and further when, for example, sludge, and the like containing water is accommodated in the unit bags, the sludge can be easily dehydrated by squeezing the bags.

Next, an embodiment of the waste treatment system using the waste accommodating bag will be described.

FIG. 1 is a conceptual view showing the waste treatment system of the present invention. The waste treatment system of the present invention is arranged such that water-containing sludge waste S such as kitchen garbage, excrement and urine, and the like discharged from restaurants and bowls 60 are accommodated in a sludge tank, for example, a combined treatment tank 7 in a precipitated state and introduced into a storage tank 8 by a prescribed amount through a pump P1 every time a valve V1 is opened and temporarily stored therein.

The sludge waste S stored in the storage tank 8 is accommodated in the permeable unit bags 2a, 1b . . . of the waste accommodating bag 1 fed successively through the openings 3a thereof; the sludge waste S is dehydrated by squeezing the unit bag 2a in which the sludge waste S is accommodated while preventing the backward flow thereof; and the water squeezed from the sludge waste S is returned into the combined treatment tank 7 through a pump P2. Further, the dehydrated sludge waste S is dried by a drying means 11 and solidified and transported by a solid state.

With this operation, since at least the fine particles of the water-containing sludge waste S are accommodated in the combined treatment tank 7 in a participated state, it is possible to accommodate the kitchen garbage generated in homes and restaurants through a disposer or the like when it is crushed and fluidized and extra sludge is supplied to the storage tank 8 little by little so that the sludge waste S can be biologically processed stably.

Further, the sludge accommodated in the unit bag 2a in a prescribed quantity through the opening 3a can be effectively dehydrated by squeezing the unit bag 2a by the dehydrating means 10 and the water squeezed from the sludge waste S can be returned into the combined treatment tank 7.

The dehydrated sludge waste S is directly destroyed by fire. Otherwise, it is dried once in a drying process so that it can be easily transported and sanitarily disposed of.

Figure 3:
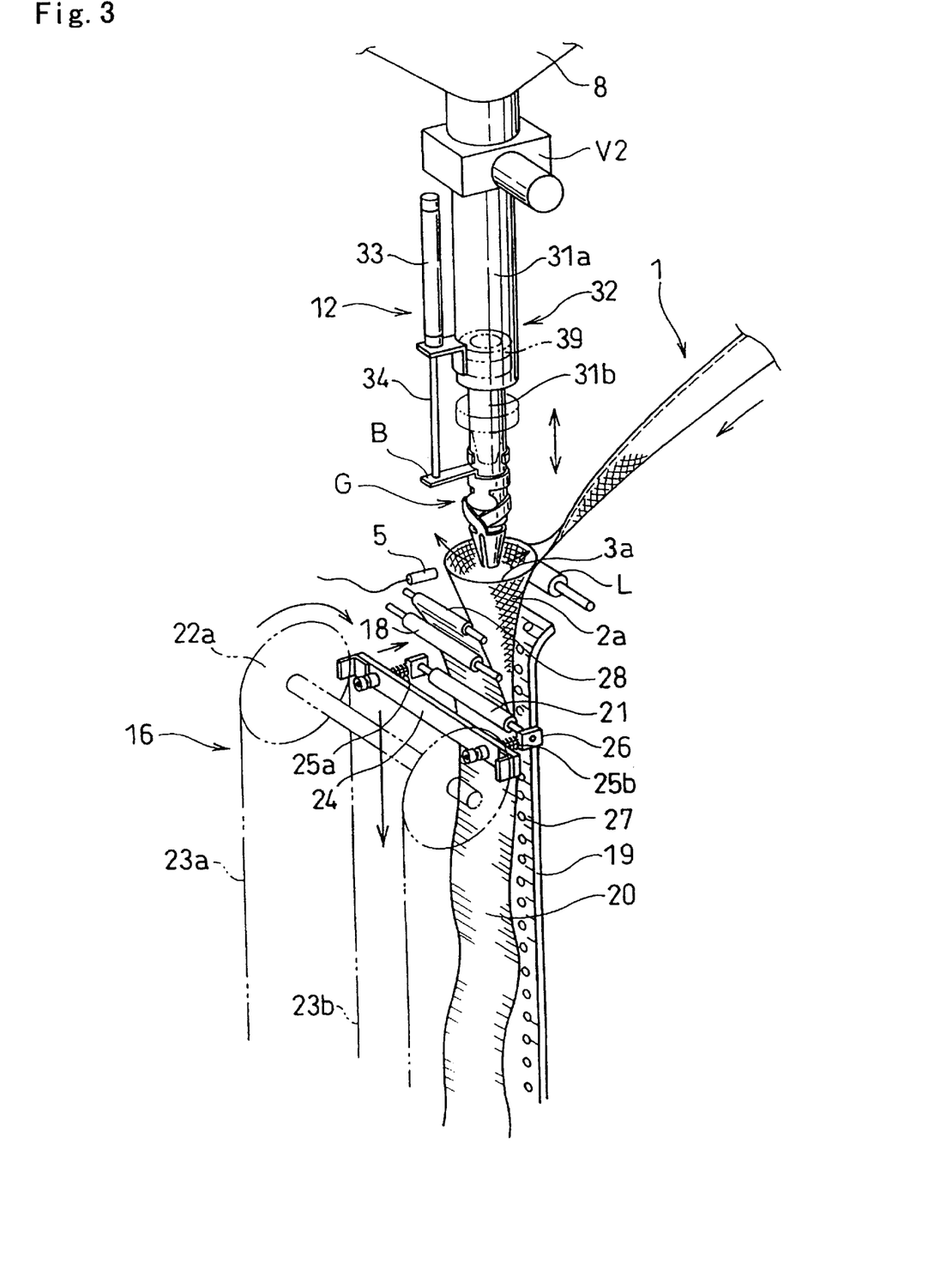
FIG. 3 is a perspective view showing the relationship between the discharge port of a storage tank in a dehydrating device of a waste treatment apparatus and the opening of a unit bag.
Figure 4:
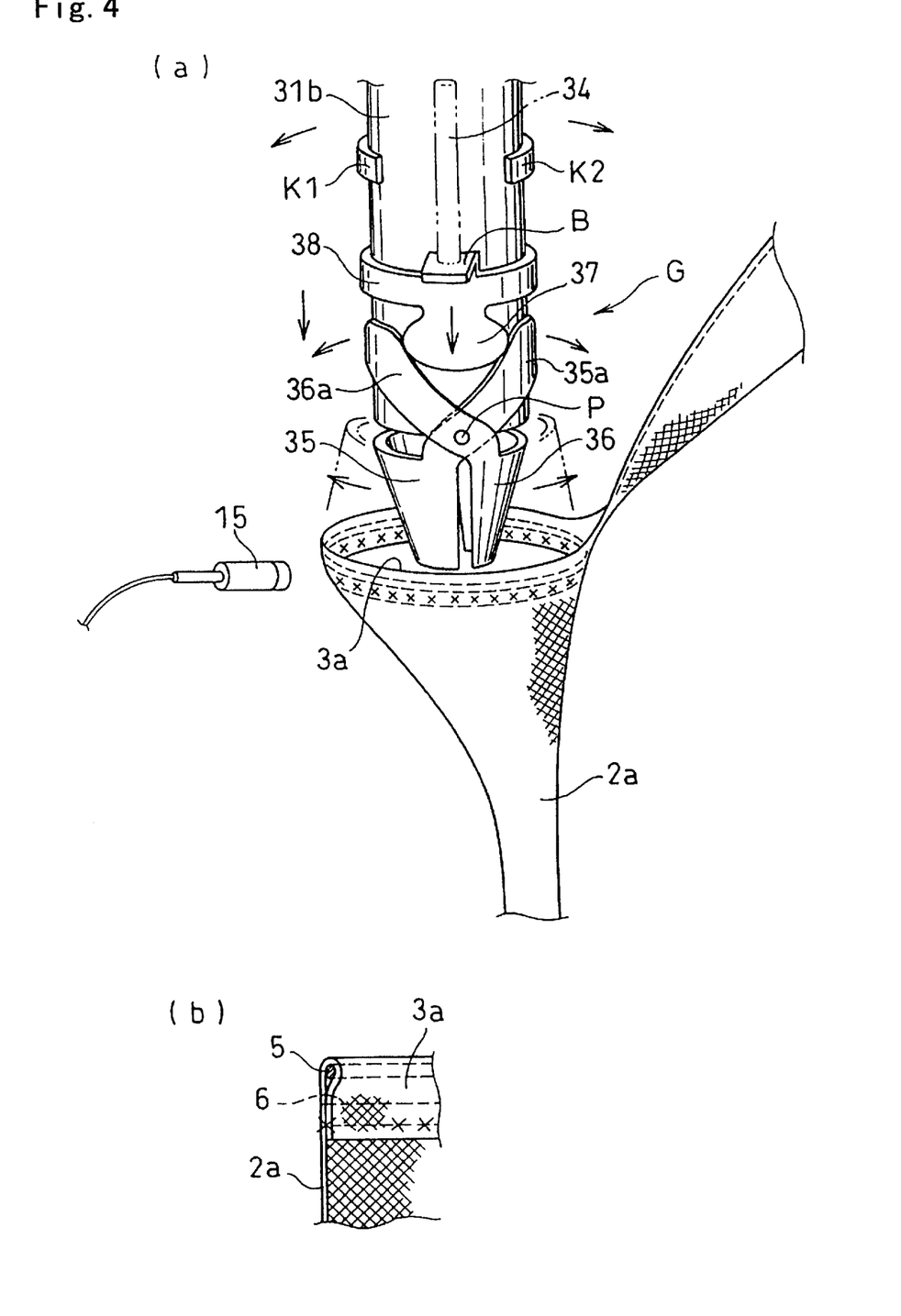
FIG. 4A is an enlarged perspective view showing the relationship between an expanding mechanism disposed to the discharge port of the storage tank and the opening of the unit bag positioned.
FIG. 4B is a partially enlarged sectional view showing how an annular elastic body is attached to the opening of the unit bag.

Next, a waste treatment apparatus of the present invention will be described. FIG. 3 is a perspective view showing the relationship between the discharge port of a storage tank in a dehydrating device of a waste treatment apparatus and the opening of the unit bag member, FIG. 4A is an enlarged perspective view showing the relationship between an expanding mechanism disposed to the discharge port of the storage tank and the opening of the unit bag to be positioned, FIG. 4B is a partially enlarged sectional view showing how an annular elastic body is attached to the opening of the unit bag and FIG. 5 is a perspective view showing the relationship between the dehydrating device and a bag feed device.

Figure 5:
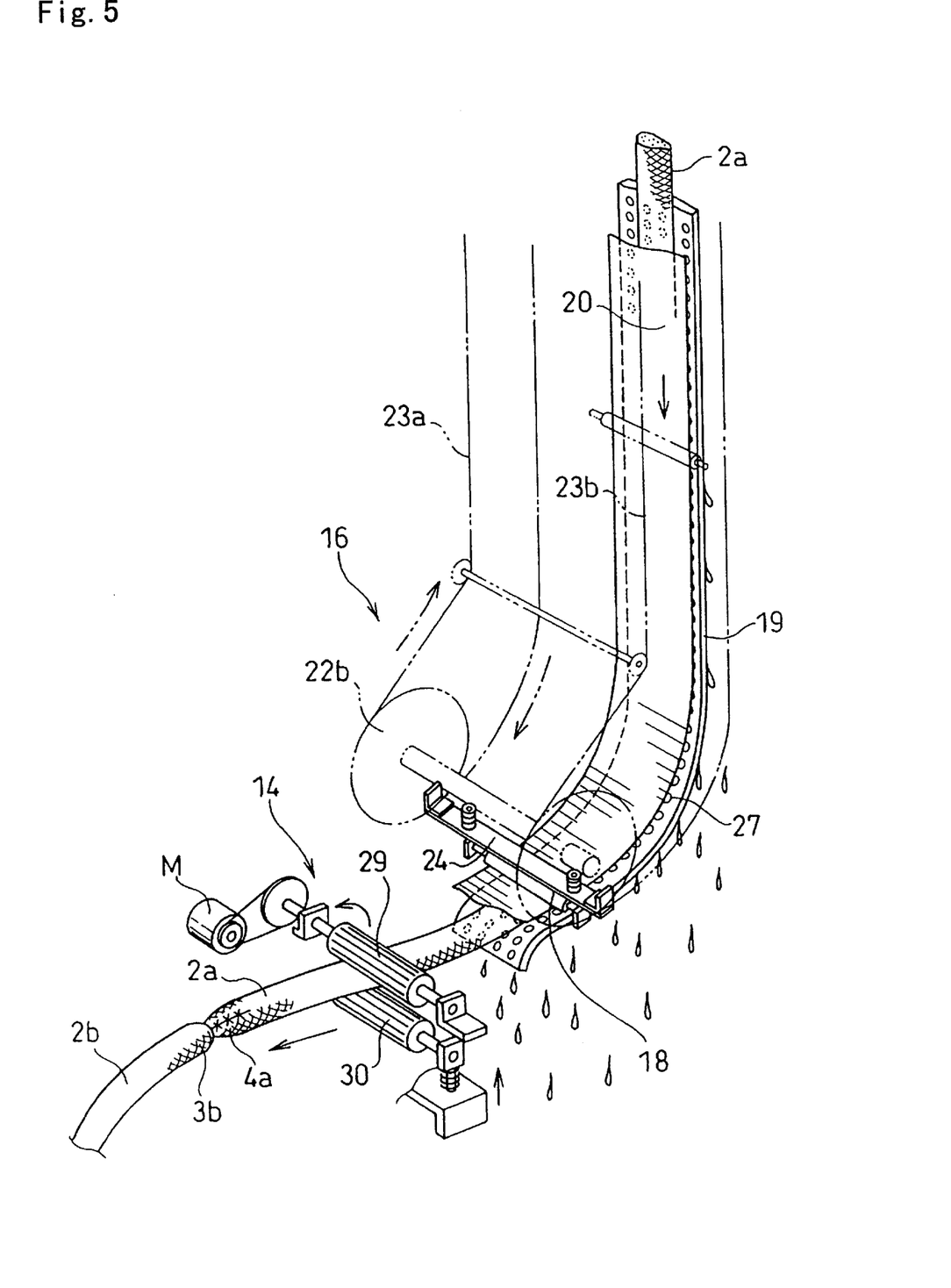
FIG. 5 is a perspective view showing the relationship between the dehydrating device and a bag feed device.

In FIG. 1, FIG. 3 and FIG. 5, the waste treatment apparatus is composed of a combined treatment tank 7 for accommodating sludge waste S containing water and crushed to fine particles in a participated state, a strip-shaped waste accommodating bag 1 composed of permeable unit bags 2a, 2b . . . which have openings 3a, 3b . . . at prescribed intervals and are successively connected in a lengthwise direction, a bag feed device 14 for successively feeding the waste accommodating bag 1 in order to that the sludge waste S discharged from a storage tank 8 in a prescribed quantity is accommodated therein and positioning the openings 3a, 3b . . . of the respective unit bags 2a, 2b . . . just below the discharge port 32 the storage tank 8, a position sensing device 15 for sensing the opening 3a of the unit bag 2a having been fed up to just below the discharge port 32 of the storage tank 8, a dehydrating device 16 for squeezing and dehydrating the sludge waste S accommodated in the unit bag 2a through the opening 3a positioned just below the discharge port 32 and a pump P2 as a liquid return means for returning the water squeezed from the sludge waste S to the combined treatment tank 7. Numeral 4a and 4b denote the closed bottoms of the units bags.

The dehydrating device 16 is composed of a pressure roller 18 as a closing means for closing the opening 3a of the unit bag 2a in which the sludge waste S is accommodated, a strip-shaped abutting plate 19 extending along sides of the unit bags 2a, 2b . . . moving downward, a roller L located at the position where the opening of each unit bag stops at the upper end of the abutting plate 19 for moving and guiding the unit bag downward, a flexible protection plate 20 disposed in confrontation with the abutting plate 19 through the unit bag 2a accommodating the sludge waste S and hung down by being supported at the upper end 28 thereof and a roller member 21 moving in a longitudinal direction while squeezing the unit bag 2a between it and the abutting plate 19 through the protection plate 20.

More specifically, the roller member 21 is rotatably supported by a pair of holders 26 which are attached to both the ends of a bracket 24 fixed to a pair of chain 23a, 23b and urged outward by compressed springs 25. These holders 26 are fixed to chains 23a, 23b trained around a pair of the upper and lower sprocket wheels 22a, 22b of the dehydrating device 16.

The bag feed device 14 is composed of a pair of rollers 29, 30 and disposed to the lower end of the unit bag 2a to be dehydrated.

The upper roller 29 is a driving roller which is driven by a motor M and the lower roller 30 disposed below the roller 29 in confrontation therewith is a pressure roller for elastically pressing the unit bag 2a. The outer peripheries of the driving roller 29 and the pressure roller 30 are formed irregularly in a longitudinal direction.

Next, the storage tank 8 will be described. As shown in FIG. 3, the discharge port 32 disposed to the bottom of the storage vessel 8 is composed of a large diameter cylindrical member 31a and a small diameter cylindrical member 31b; and the upper portion of the small diameter cylindrical member 31b is inserted into the large diameter cylindrical member 31a and the downward movement thereof is regulated by a stopper 39 so as to permit the discharge port 32 to extend and contract. An expanding mechanism G is disposed to the discharge port of the small diameter cylindrical member 31b at the lower end thereof.

As shown in FIG. 3, the small diameter cylindrical member 31b is moved with respect to the large diameter cylindrical member 31a by being extended and contracted by a hydraulic cylinder 33 as a single drive source 12. The expanding mechanism G is associated with the above movement of the small diameter cylindrical member 31b. That is, the expanding mechanism G moves the small diameter cylindrical member 31b which is positioned at an upper position in a closed state toward the opening 3a of the unit bag 2a and opens the closed small diameter cylindrical member 31b when the small diameter cylindrical member 31b is inserted into the opening 3a and expands the opening 3a.

As shown in FIG. 4A, the expanding mechanism G has opening/closing members 35, 36 which are formed by longitudinally dividing a conical member into two sections and disposed below the discharge port at the lower end of the small diameter cylindrical member 31b. A pair of arms 35a, 35b extend upward from both the upper sides of the opening/closing members 35, 36 and swingably supported by a pin P inserted to the opening/closing members 35, 36 at the intersecting position thereof.

The outer peripheries of cams 37, which are formed to both the lower ends of a ring 38 fitted on the outer periphery of the small diameter cylindrical member 31b so as to move along the outer periphery, are partly slidably abutted against the upper peripheral edges of the pair of intersecting arms 35a, 35b at the positions therebetween.

The extreme end of the piston rod 34 of the hydraulic cylinder 33 is fixed to a locking piece B laterally projecting from an upper portion of the ring 38.

Next, the operation of the expanding mechanism G will be described. That is, as shown in FIG. 3 and FIG. 4A, when the piston rod 34 is extended by operating the hydraulic cylinder 33, the small diameter cylindrical member 31b accommodated in the large diameter cylindrical member 31a is moved downward and the downward movement of the small diameter cylindrical member 31b is regulated by the stopper 39.

In this state, the opening/closing members 35, 36 located at the lower end of the small diameter cylindrical member 31b in a closed state are inserted into the opening 3a of the unit bag 2a.

When the piston rod 34 is further extended, only the ring 38 is moved downward and the cams 37 formed to both the lower ends of the ring 38 are abutted against the upper peripheral edges of the pair of intersecting arms 35a, 35b therebetween.

With this operation, the opening/closing members 35, 36 are expanded in the opening 3a of the unit bag 2a by the action of the cams 37 to thereby forcibly open the opening 3a.

After a prescribed quantity of the sludge waste S is charged into the unit bag 2a from the storage tank 8, the piston rod 34 is moved upward by the action of the hydraulic cylinder 33, the cams 37 are moved upward thereby and the pair of expanded arms 35a, 35b are closed by their own weights or making use of an elastic member.

When the piston rod 34 is further moved upward, the ring 38 is moved upward by it along the outer periphery of the small diameter cylindrical member 31b and abutted against stoppers K1, K2. When the stoppers K1, K2 are moved upward, the small diameter cylindrical member 31b held in the large diameter cylindrical member 31a with the upper end thereof locked to the stopper 39 is accommodated in the large diameter cylindrical member 31a.

With this operation, even if the opening of unit bag is not reliably positioned or even if the opening is inclined and the sludge waste cannot be smoothly charged thereinto, the opening can be expanded by the expanding mechanism when the discharge port is inserted into the opening.

Next, dehydration processes performed by the waste treatment apparatus of the present invention will be described. FIG. 6A to FIG. 6C and FIG. 7A and FIG. 7B are process views showing the action of the sludge waste dehydration processes for dehydrating sludge waste.

Figure 6:
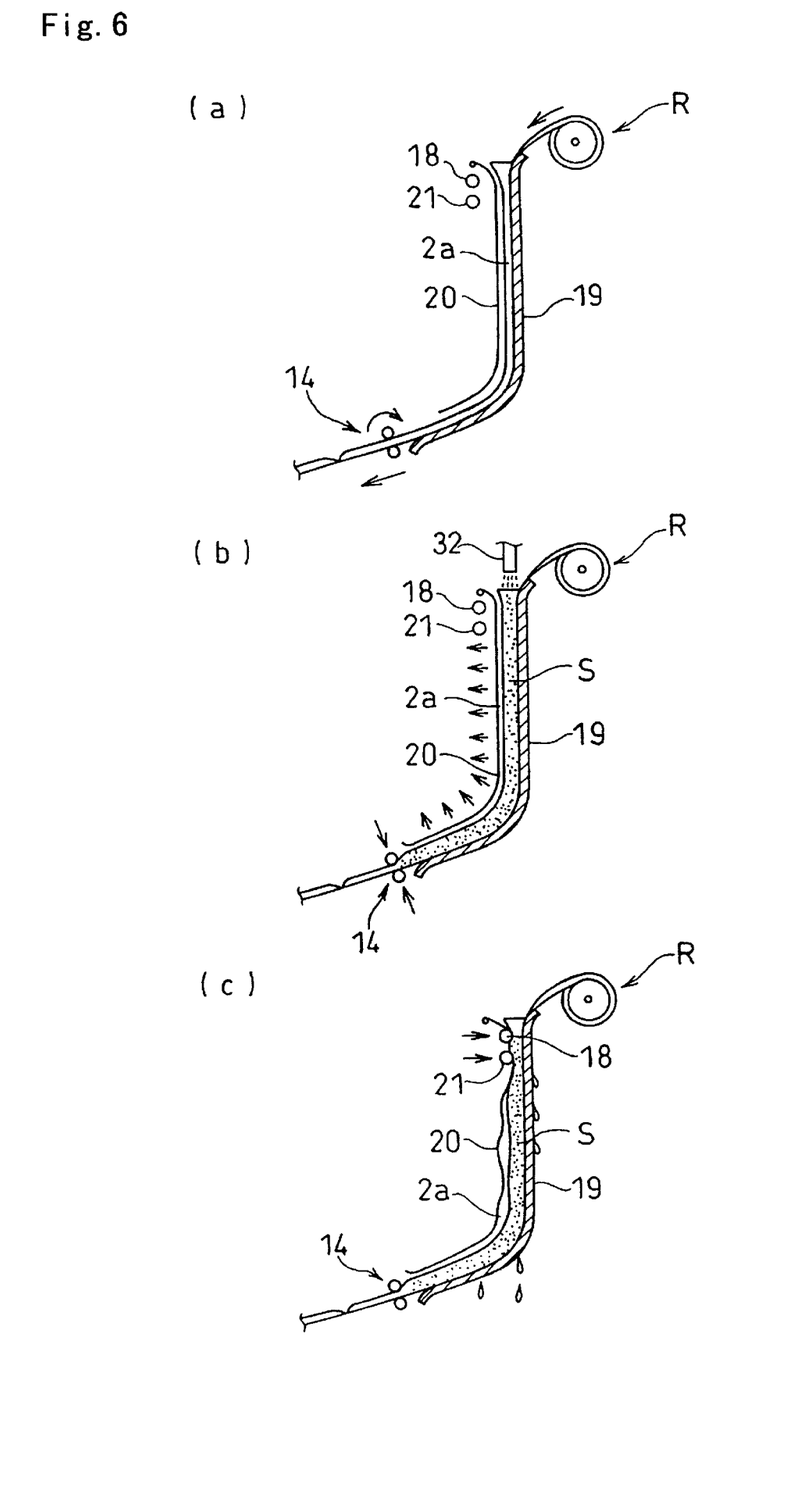
FIG. 6A to FIG. 6C are process views showing the action of sludge waste dehydrating processes.

In FIG. 6A, a unit bag 2a of the waste accommodating bag 1 is fed into the dehydrating means 10 by the feed device 14 and stopped when the opening 3a of the unit bag 2a is detected by a sensor 15 as a position sensing device so that the opening 3*a* is positioned at the upper end of the dehydrating means 10, that is, at the lower end of the discharge port 32 of the storage tank 8. What is important here is that the opening 3*a* is expanded. When this is satisfied, even if the bottom sections 4*a*, 4*b* are not closed, the sludge is not discharged from the lower opening so long as the downward flow of the sludge is stopped by the feed device 14 or the like.

Next, the prescribed quantity of the sludge waste S is charged into the unit bag 2*a* positioned at the prescribed location through the opening 3*a* thereof from the discharge port 32 of the storage tank 8 shown in FIG. 6B.

When the sludge waste S is charged into the unit bag 2*a*, the opening 3*a* of the unit bag 2*a* is closed by the pressure roller 18 as the closing means as shown in FIG. 6C so that the backward flow of the sludge waste S is prevented.

Figure 7:
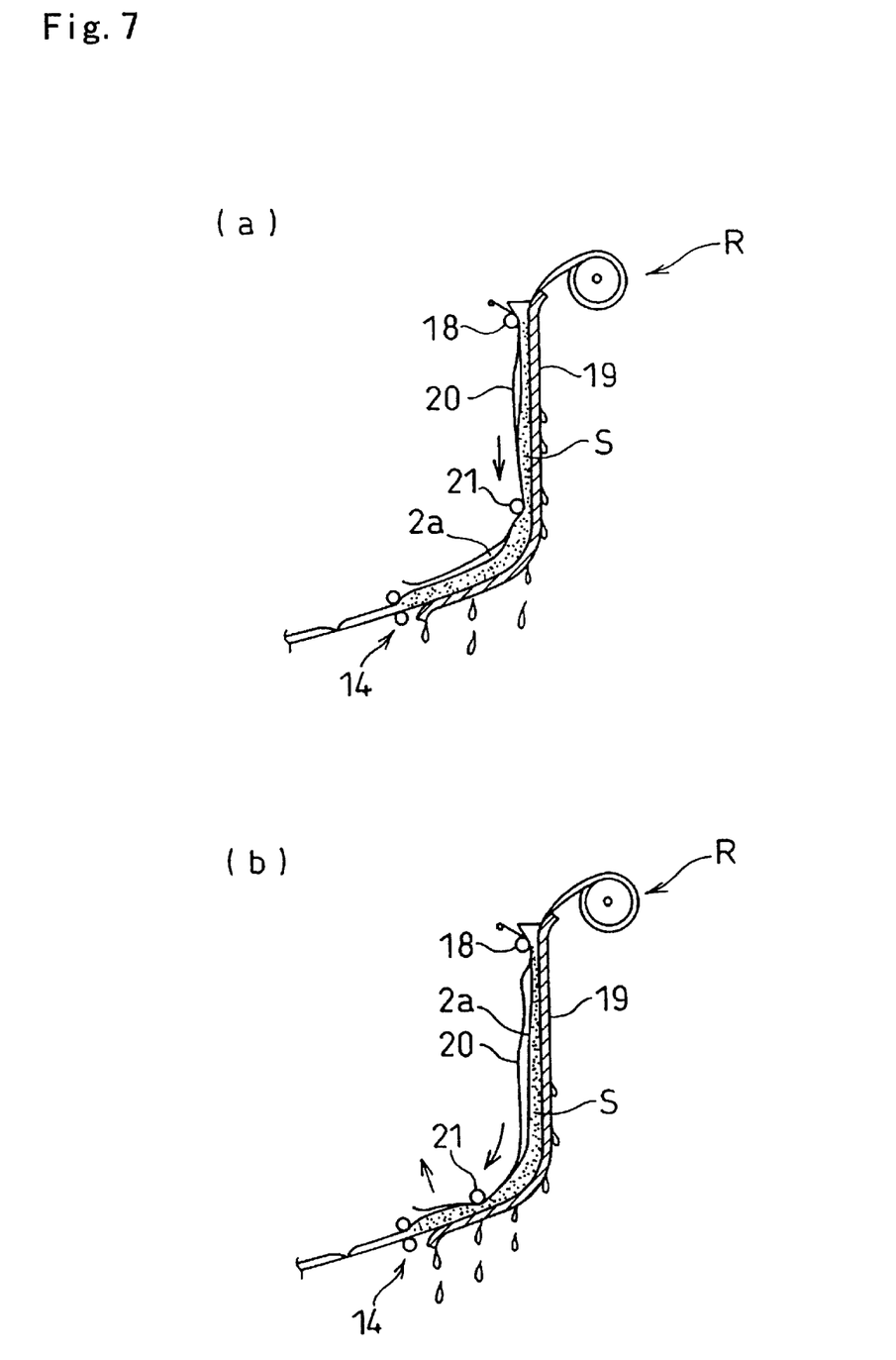
FIG. 7A and FIG. 7B are process views showing the action of sludge waste dehydrating processes.

Subsequently, the unit bag 2*a* the upper end of which is clamped between the pressure roller 18 and the abutting plate 19 and supported thereby is pressed against the abutting plate 19 by the roller member 21 through the protection plate 20 and roller member 21 is moved downward in this state as shown in FIG. 7A.

As shown in FIG. 7B, the downward movement of the roller member 21 causes the sludge waste S accommodated in the sealed unit bag 2*a* to be squeezed and the water squeezed from the sludge waste S is sequentially discharged. At the same time, the waste water also discharged from a plurality of through holes 27 formed to the abutting plate 19 is collected to the bottom of the waste treatment apparatus and returned into the combined treatment tank 7 by the liquid return means.

With this operation, since the unit bag 2*a*, which moves downward in the state that the opening 3*a* is closed by the roller member 21 and the backward flow of the sludge waste S therein is prevented, is squeezed between the roller member 21 and the strip-shaped abutting plate 19 through the protection plate 20, the roller member 21 does not directly come into contact with the unit bag 2*a*. Accordingly, the breakage of the unit bag 2*a* is avoided when it is squeezed and the prescribed shape of the unit bag 2*a* can be maintained without the leakage of the sludge waste S, whereby the disposal of the sludge waste S can be rationalized.

In dehydration, since the unit bag 2*a* can be sufficiently squeezed and the water squeezed from the sludge waste S is discharged to the outside through the plurality of through holes 27 of the abutting plate 19, the dehydrating property of the sludge waste S in the unit bag 2*a* can be improved.

Further, since the unit bags 2*a*, 2*b* . . . formed to the waste accommodating bag 1 at the prescribed intervals are sequentially fed and positioned just below the discharge port 32 of the storage tank 8, the prescribed quantity of the sludge waste S is automatically and sequentially charged from the discharge port 32 into the respective unit bags 2*a*, 2*b* through the openings 3*a*, 3*b* . . . located at the prescribed intervals. Therefore, the sludge waste S in the unit bag 2*a* can be effectively dehydrated by being squeezed by the dehydrating device 16 and the water squeezed from the sludge waste S can be returned into the combined treatment tank 7 through the liquid return means.

Figure 8:
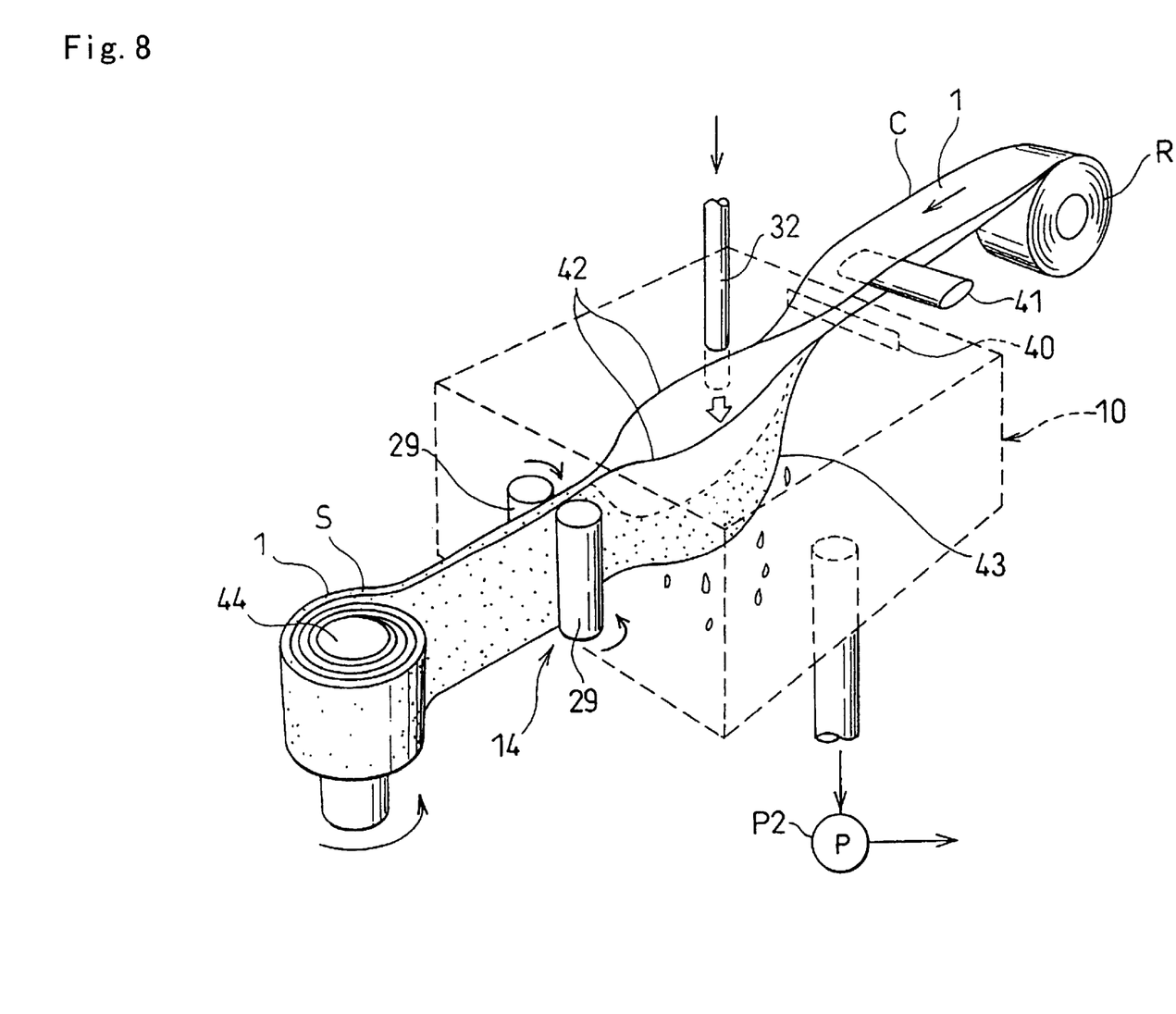
FIG. 8 is a perspective view showing the dehydrating device and the bag feed device as a second embodiment.

FIG. 8 shows a second embodiment of the present invention which is different from the above embodiment in the structure of a waste accommodating bag 1 and a method of feeding the waste accommodating bag 1.

The waste accommodating bag 1 is composed of permeable paper or cloth (nonwoven fabric or the like) likewise the above embodiment and is arranged as a rolled unit R by being folded to two sections in a longitudinal direction along an approximate center folding line C. Then, the waste accommodating bag 1 is fed into a dehydrating means 10 from the opening 40 thereof while being unfolded by an unfolding piece 41 to a prescribed width as shown in FIG. 8. The lower edge 43 of the waste accommodating bag 1 is formed by disposing the center folding line C to a lower location and the two edge lines of the waste accommodating bag 1 which is disposed at upper locations opposite to the lower edge 43 constitute the upper edges 42 of the waste accommodating bag 1. The lower edge 43 is closed at all times because it is formed by folding the waste accommodating bag 1 and the open portion of the waste accommodating bag 1 is formed by the upper edges 42.

Numeral 14 denotes a feed device composed of two drive rollers 29. The drive rollers 29 clamp the waste accommodating bag 1 therebetween in a longitudinal direction, squeeze it and feed it to the outside. At the time, the opening portion of the waste accommodating bag 1 formed by the upper edges thereof is opened upwardly, sludge waste S is charged into the waste accommodating bag 1 from a discharge port 32 and primarily dehydrated in such a manner that only the water contained in the sludge waste S is squeezed. The sludge waste S remaining in the waste accommodating bag 1 is secondarily dehydrated by being squeezed by the drive rollers 29, crushed in the waste accommodating bag 1 and discharged. Numeral 44 denotes a drive roller for rolling up the cake of the sludge waste S discharged in a strip-shape.

The employment of the structure of the second embodiment permits the successive movement of the waste accommodating bag 1 and the successive discharge of the sludge waste S, whereby a maintenance free system can be made at a very low cost. The system can be automated by previously regulating the quantity of sludge discharged from the discharge port 32 and the rolled amount of the waste accommodating bag 1.

While the embodiments of the present invention have been described above with reference the drawings, the specific arrangements of the invention are by no means limited to the above embodiments and it goes without saying that various improvements and additions made within the range of the gist of the invention are included in the invention. The combined treatment tank 7 is only an example of the sludge tank and the sludge tank includes any vessels and reservoirs where sludge exists such as ponds, sewerage systems, and the like.

The present invention will achieve the following advantages.

(a) According to a first aspect of the present invention, since the precipitated sludge waste can be accommodated in the bag through the opening thereof and dehydrated by being squeezed by a dehydrating means, the sludge waste can be taken out in a solid state, whereby it can be disposed of sanitarily and easily.

(b) According to a second aspect of the present invention, since the bag used to dehydrate the sludge waste is sequentially fed with the upper edge opened and the lower edge closed, not only the sludge waste can be successively charged thereinto but also the bag can be stored in a layered state (folded or wound) in a small space as well as the sludge waste can be reliably dehydrated.

(c) According a third aspect of the present invention, not only the bags can be stored in a layered state (folded or wound) in a small space but also the sludge waste can be reliably dehydrated by intermittently charging the sludge waste.

(d) According to a fourth aspect of the present invention, since the plurality of unit bags are successively formed to the permeable strip-shaped nonwoven fabric, the unit bags can be made compact by being wound and easily stored as well as successively fed one by one. Since the annular elastic member is disposed around the opening of each of the bags, when the bags are successively fed from a rolled unit, the opening can be expanded by the elastic force of the annular elastic member. Since the magnetically sensing object or the optically sensing object is disposed around the opening or at a position spaced apart from the opening a prescribed distance, the opening fed from the rolled unit can be positioned by sensing the sensing object by, for example, a sensor. Further, when sludge, and the like which contain water are accommodated in the waste accommodating bag and squeezed, the sludge can be easily dehydrated.

(e) According to a fifth aspect of the present invention, the bags can be reliably detected even if they are flexible.

(f) According to a sixth aspect of the present invention, when the strip-shaped waste accommodating bags are successively fed by a bag feed device and the openings of the bags are positioned just below the discharge port of the sludge tank, the sludge waste can be sequentially accommodated into the bags from the openings at prescribed intervals and the sludge waste in the bags is effectively dehydrated by being squeezed by the dehydrating device. Further, the water obtained from the dehydrated sludge waste can be returned to a combined treatment tank.

(g) According to a seventh aspect of the present invention, since the unit bag, which moves downward with the opening closed by the closing means, is squeezed between the roller member and the strip-shaped abutting plate through the protection plate, the roller member does not directly come into contact with the unit bag. Accordingly, the breakage of the unit bag is avoided when it is squeezed and the prescribed shape of the unit bag can be maintained without the leakage of the sludge waste, whereby the disposal of the sludge waste can be rationalized.

(h) According to an eight aspect of the present invention, even if the opening of the unit bag is not reliably positioned or even if the opening is inclined and the charge of the sludge waste is obstructed, the opening of the unit bag can be expanded by the expanding mechanism in the process that the discharge port is inserted into the opening.

(i) According to a ninth aspect of the present invention, since the unit bag can be sufficiently squeezed in the dehydration process, the water extracted from the unit bag can be discharged to the outside through the through holes of the abutting plate, whereby the dehydrating property of the unit bag can be improved.

(j) According to the a tenth aspect of the present invention, the sludge waste can be successively charged because the upper edges of the waste accommodating bags are opened at all times and dehydration can be performed effectively by the dehydration processing associated with the charge. Further, the cake obtained from the dehydrated waste can be formed to a plate shape, whereby the waste can be easily transported for disposal and destroy by fire.

What is claimed is:

1. A waste treatment system using a waste accommodating bag, comprising the steps of:

accommodating sludge waste discharged from a sludge tank into a series of permeable bags fed successively through the openings of the bags, said series of permeable bags comprising a series of laterally long strip-shaped members with an upper edge thereof opened and a lower edge thereof closed;

dehydrating the sludge waste by squeezing the series of bags in which the waste is accommodated; and returning the water squeezed from the sludge waste to the sludge tank.

2. A waste treatment system using a waste accommodating bag, comprising the steps of:

accommodating sludge waste discharged from a sludge tank into a plurality of permeable unit bags fed successively through the openings of the bags, said plurality of permeable unit bags being strip-shaped and sequentially connected to each other with upper edges of the unit bags opened and lower edges thereof closed;

dehydrating the sludge waste by squeezing the series of bags in which the waste is accommodated; and returning the water squeezed from the sludge waste to the sludge tank.

3. A waste treatment system according to claim 2, wherein an elastic member is disposed around the opening of each of the plurality of permeable unit bags successively connected to each other formed to an end thereof for expanding the opening, the closed bottom of a preceding unit bag is located just forwardly of the opening of a following bag and a magnetic sensing object or an optical sensing object is disposed around the opening or at a position spaced apart from the opening a prescribed distance.

4. A waste treatment system according to claim 3, wherein paint or powder composed of a magnetic material is applied around the opening or at a position spaced apart from the opening a prescribed distance.

5. A waste treatment apparatus, comprising:

a sludge tank for accommodating water-containing sludge waste;

a strip-shaped permeable waste accommodating bag having a plurality of unit bags to which openings are formed at prescribed intervals;

a bag feed device for successively feeding the waste accommodating bag for accommodating the sludge waste discharged from the sludge tank in a prescribed quantity and positioning the openings of the respective unit bags just below the discharge port of a storage tank;

a position sensing device for sensing the opening of the unit bag fed just below the discharge port and transmitting the position signal of the opening to the bag feed device;

a dehydrating device for squeezing and dehydrating the sludge waste accommodated in the waste accommodating bag through the opening positioned just below the discharge port of the storage tank; and a liquid return device for returning the squeezed water to the sludge tank.

6. A waste treatment apparatus according to claim 5, wherein the dehydrating device comprising:

a closing member for closing the opening of the unit bag in which the sludge waste is accommodated;

a strip-shaped abutting plate extending along a side of the unit bags moving downward;

a flexible protection plate disposed in confrontation with the abutting plate through the unit bags which accommodate the sludge waste therein and are interposed therebetween; and a roller member moving in a longitudinal direction while squeezing the unit bags between it and the abutting plate through the protective plate.

7. A waste treatment apparatus according to claim 6, wherein the abutting plate has rigidity and a plurality of through holes formed thereto.

8. A waste treatment apparatus according to claim 6, comprising:

an extending and contracting cylindrical discharge member for discharging the sludge waste in the prescribed quantity; and an expanding mechanism disposed to the discharge port of the cylindrical discharge member at the extreme end thereof for expanding the opening of the unit bag in a process that the cylindrical discharge member is moved toward the opening of the unit bag and the discharge port is inserted into the opening of the unit bag.

* * * * *